(12) United States Patent
Salles et al.

(10) Patent No.: US 10,814,708 B2
(45) Date of Patent: Oct. 27, 2020

(54) SIGNALING ASSEMBLY FOR A DOOR LEAF, DOOR AND CORRESPONDING TRANSPORT VEHICLE

(71) Applicant: FAIVELEY TRANSPORT TOURS, Saint-Pierre-des-Corps (FR)

(72) Inventors: Olivier Salles, Lecousse (FR); Fabien Vautier, Veretz (FR)

(73) Assignee: FAIVELEY TRANSPORT TOURS, Saint-Pierre-des-Corps (FR)

( * ) Notice: Subject to any disclaimer, the term of this patent is extended or adjusted under 35 U.S.C. 154(b) by 32 days.

(21) Appl. No.: 16/272,218

(22) Filed: Feb. 11, 2019

(65) Prior Publication Data
US 2019/0255923 A1 Aug. 22, 2019

(30) Foreign Application Priority Data

Feb. 22, 2018 (FR) ...................................... 18 51501

(51) Int. Cl.
*B60J 10/40* (2016.01)
*B60Q 1/32* (2006.01)
(Continued)

(52) U.S. Cl.
CPC ............... *B60J 10/40* (2016.02); *B60J 10/00* (2013.01); *B60J 10/36* (2016.02); *B60J 10/84* (2016.02);
(Continued)

(58) Field of Classification Search
CPC . B60J 5/04; B60J 5/0468; B60J 5/0477; B60J 5/06; B60J 10/00; B60J 10/36;
(Continued)

(56) References Cited

U.S. PATENT DOCUMENTS 4,051,336 A 9/1977 Miller
5,433,031 A * 7/1995 Dailey .................... B60J 10/40
49/27
(Continued)

FOREIGN PATENT DOCUMENTS

DE 1982028 U 3/1968
DE 2658660 A1 * 6/1978 .............. B60J 10/40
(Continued)

OTHER PUBLICATIONS

French Search Report, dated Jun. 21, 2018, corresponding to French Application No. 1851501.

*Primary Examiner* — Jason S Daniels
(74) *Attorney, Agent, or Firm* — Christopher R. Carroll; The Small Patent Law Group LLC

(57) ABSTRACT

A signaling assembly for a door leaf of an access door to a transport vehicle, including a seal that has an attaching region intended to be received at least partially in the housing of a profile of the door leaf, as well as a lighting region, and means of lighting, able to illuminate the lighting region of the seal, in such a way as to emit at least one visual signal, in particular representative of the opened and/or closed state of the door. The assembly includes a locking key received at least partially in an interior volume of the seal, with the key being able to prevent a pulling off of the seal outside the profile along a transversal direction, in reference to the main direction of the seal, the means of lighting being fixed on the locking key.

18 Claims, 4 Drawing Sheets

(51) Int. Cl.
  *B60J 10/36* (2016.01)
  *B60J 10/84* (2016.01)
  *B60J 10/00* (2016.01)
  *B60J 10/86* (2016.01)
  *B61D 19/02* (2006.01)
  *B61D 29/00* (2006.01)

(52) U.S. Cl.
  CPC .............. *B60J 10/86* (2016.02); *B60Q 1/323* (2013.01); *B61D 19/02* (2013.01); *B61D 19/026* (2013.01); *B61D 29/00* (2013.01)

(58) Field of Classification Search
  CPC ... B60J 10/40; B60J 10/80; B60J 10/84; B60J 10/86; B60Q 1/323
  USPC ...................................................... 296/146.9
  See application file for complete search history.

(56) References Cited

U.S. PATENT DOCUMENTS

| | | | |
|---|---|---|---|
| 2002/0152686 A1* | 10/2002 | Whitehead | B60J 10/80 49/475.1 |
| 2005/0073852 A1* | 4/2005 | Ward | B60Q 1/305 362/501 |
| 2017/0305247 A1 | 10/2017 | Salles et al. | |

FOREIGN PATENT DOCUMENTS

| | | | | |
|---|---|---|---|---|
| DE | 10 2015 112 041 A1 | 1/2017 | | |
| WO | 2011/138292 A1 | 11/2011 | | |
| WO | WO-2011138292 A1 * | 11/2011 | ............. | B60Q 1/323 |

* cited by examiner

SIGNALING ASSEMBLY FOR A DOOR LEAF, DOOR AND CORRESPONDING TRANSPORT VEHICLE

TECHNICAL FIELD OF THE INVENTION

This invention relates to the field of access doors to a transport vehicle. These access doors can first of all designate doors that belong to transport vehicles, in particular of the train, tramway, subway, trolleybus or bus type. In terms of the invention, these access doors also designate so-called landing doors, also called platform screens.

The invention relates more specifically to a door leaf that belongs to such an access door, which comprises means that make it possible to signal, to the attention of travelers, information relative to the open and/or closed state of this door. The invention relates in particular to a door leaf of a sliding door, but also has application for other types of door leaves, in particular those provided on doors of the pivoting/sliding type. The invention relates to doors that can be provided, either with a single door leaf, or with two door leaves.

PRIOR ART

During the stopping of a transport vehicle, the doors of the latter open and then close in such a way as to allow the passengers to come aboard this vehicle, or to disembark therefrom. In the case where the platform is provided with landing doors, the latter are also subject to opening and closing. During these operations, incidents are able to occur. Mention shall be made in particular of the possibility of trapping a passenger, an object or an animal, or a problem of a technical nature that prevents the normal displacement of this door.

It is acknowledged that these incidents are detrimental to the normal service of the vehicle, for several reasons. Thus, they are able to damage the objects trapped by the door. Moreover, more critically, they can cause injuries to the travelers, involving the liability of the transport company. Finally, these incidents are of a nature as to substantially delay the vehicle.

In order to prevent these incidents as much as possible, it has been proposed to provide the doors with lighted means of signaling. Typically, the purpose of the latter are to provide the passengers with information, concerning the open state of the door. It can in particular be indicated if the door is in the process of closing, in the process of opening, or if it is condemned. In this way, the safety of the travelers is preserved, while still reducing the risk of the vehicle being delayed.

Constructively, a solution is first known consisting in placing these means of signaling on the maneuvering members of the doors, such as their push-button. This first solution however has certain disadvantages. Indeed, the illuminated surface is relatively small, which makes the information difficult for the users to perceive.

It has also been proposed to use light-emitting diodes (LEDs). A first solution, known in the document Knorr Bremse WO 2011/138292, provides to fasten these diodes directly on the outer face of the door leaf of the door. However, the information delivered by these diodes is then substantially invisible from the inside, when the door is open. Moreover, this solution entails a substantial modification of the structure of the door leaf, in such a way that it cannot be applied simply on existing vehicles.

Generally the mounting of a seal by snap-fitting, on a door leaf of an access door to a transport vehicle, is detrimental to the physical integrity of the operators. Thus, given that this snap-fitting has to resist vandalism, it has to be carried out with a tight adjustment. In practice, this requires inserting the seal by striking it with a mallet, which generates musculoskeletal disorders (MSD), such as tendinitis, in the operators.

In light of the above, an objective of this invention is to remedy, at least partially, the disadvantages of prior art mentioned hereinabove.

Another objective of the invention is to create a lighted signaling of satisfactory intensity, so that first of all it can easily be seen by the users, whether the latter are inside or outside the vehicle.

Another objective of the invention is to create a lighted signaling that can be perceived in a satisfactory manner by the users in all conditions of exposure, in particular when the door is outdoors, in particular in direct sunlight.

Another objective of the invention is to propose a lighted signaling assembly that can be mounted on the door leaf in a practical way, in particular requiring relatively very little physical effort.

Another objective of the invention is to propose such a signaling assembly that can be maintained in a reliable manner on a door leaf of a door, even in the case of vandalism.

Another objective of the invention is to propose such a signaling assembly, of which the maintenance is facilitated with respect to prior art.

Another objective of the invention is to propose such a signaling assembly, of which the mechanical structure is relatively simple.

OBJECTS OF THE INVENTION

According to the invention, at least one of the objectives hereinabove is achieved by means of a signaling assembly (2, 3, 4) for a door leaf (60, 70) of an access door (50) to a transport vehicle, in particular a rail vehicle, said door leaf comprising a body and a profile (1, 1') extending over at least one portion of the periphery of this body, said profile defining a housing (14) open opposite said body, said signaling assembly comprising
- a seal (2), said seal comprises an attaching region (21), intended to be received at least partially in said housing of said profile, as well as a lighting region (20),
- means of lighting (4), able to illuminate said lighting region of said seal, in such a way as to emit at least one visual signal, in particular representative of the opened and/or closed state of the door, characterized in that:

said assembly further comprises at least one locking key (3) received at least partially in an interior volume (28) of said seal, said key being able to prevent a pulling off of said seal outside of said profile along a transversal direction (Y1-Y1), in reference to the main direction of said seal, the means of lighting (4) being fixed on said locking key.

According to other characteristics of the signaling assembly in accordance with the invention:

a) said interior volume (28) is bordered by faces that respectively belong to the attaching region and to the lighting region, said means of lighting (4) being turned towards the face (20') of the lighting region.

b) said means of lighting include at least one lighting member (4), which comprises a support (40) and lighting elements (42) carried by this support (40).

c) said lighting elements are of the light-emitting diode type.

d) the support (40) of the lighting member is of extended shape and, more preferably, has longitudinal dimensions that are close to those of the locking key (3).

e) this assembly comprises means of fastening, making it possible to fasten the means of lighting onto said locking key.

f) said means of fastening include removable means of fastening, in particular by screwing.

g) said means of fastening include means of fastening par collage.

h) said means of fastening include means of fastening by cooperation of shapes, in particular a slider (39) with which the key is provided, having edges (38) for retaining the lighting member (4).

i) a portion (36) of said locking key (3) protrudes outside of the interior volume (28), in such a way as to come into direct contact with said profile (1).

j) said locking key comprises a foot (30) and a stem (34) housed in the interior volume, as well as a head (35) protruding outside of the interior volume, in such a way as to come into direct contact with said profile (1).

k) said portion (36) protruding outside of the interior volume (28), in particular said head (35), is able to come into direct contact with edges (16, 17) extending from wings of said profile (1).

l) said portion (435) protruding outside of the interior volume (428), in particular said head (435), is able to come into direct contact with walls of a cover (410'), extending from a core (410) of said profile (401).

m) the distance between the wall (620') of the lighting region (620), bordering the divider volume (628), and the lighting elements (642) decreases, from the median region of this wall to the lateral zones thereof, in such a way as to distribute the impacts exerted, along the main plane of the door leaf, in the direction of said lateral zones.

n) the means of lighting (4) are integrated into the global volume, formed by the door leaf (60) and the seal (2), in such a way as to protect the means of lighting (4) from impact, exerted along an axis perpendicular to the main plane (P60) of the door leaf.

These additional characteristics can be implemented with the main object hereinabove, individually or in any technical permissible combination.

The invention also has for object a sealing assembly (2, 3) for a door leaf (60, 70) of an access door (50) to a transport vehicle, in particular a rail vehicle, said door leaf comprising a body and a profile (1, 1') extending over at least one portion of the periphery of this body, said profile defining a housing (14) open opposite said body, said sealing assembly comprising a seal (2), said seal comprises an attaching region (21), intended to be received at least partially in said housing of said profile, at least one locking key (3) received in part in an interior volume (28) of said seal, said key being able to prevent a pulling off of said seal outside of said profile along a transversal direction (Y1-Y1), in reference to the main direction of said seal, said key having a region referred to as an abutment (36), located outside of said interior volume (28), said abutment region being able to come into direct contact with said profile.

This sealing assembly can include all or a portion of the additional characteristics a) to n) mentioned hereinabove, individually or in any technical permissible combination.

The invention also has for object a method for mounting a signaling assembly such as defined hereinabove and/or of a sealing assembly such as defined hereinabove, characterized in that it comprises a step of transversal insertion of the attaching region of the seal in the housing of the profile, then a step of longitudinal introduction of the locking key into the interior volume of said seal.

The invention also has for object a method for dismounting a signaling assembly such as defined hereinabove and/or of a sealing assembly such as defined hereinabove, characterized in that it comprises a step of longitudinal removal of the locking key outside of the interior volume of the seal, then a step of extracting the seal outside of the rigid profile, more preferably along a transversal direction.

The invention also has for object a door leaf (60, 70) for an access door to a transport vehicle, in particular a rail vehicle, comprising a body (62, 72) and a frame (66, 76) extending over at least one portion of the periphery of said body, said frame comprising at least one profile (1, 1') defining a housing (14) open opposite said body, said door leaf further comprising at least one signaling assembly such as defined hereinabove, the attaching region (21) of the seal being received at least partially in said housing.

The invention also has for object a door leaf (60, 70) for an access door to a transport vehicle, in particular a rail vehicle, comprising a body (62, 72) and a frame (66, 76) extending over at least one portion of the periphery of said body, said frame comprising at least one profile (1, 1') defining a housing (14) open opposite said body, said door leaf further comprising at least one sealing assembly such as defined hereinabove, the attaching region (21) of the seal being received at least partially in said housing.

The invention also has for object an access door to a transport vehicle, in particular of the train, tramway, subway type or trolleybus or bus type, in particular the door of said transport vehicle, or a landing door for the stop platform of said transport vehicle, said door comprising a sash integral with the frame of said vehicle, or integral with said platform, as well as at least one door leaf (60, 70) such as defined hereinabove, mounted mobile with respect to said sash.

The invention also has for object a transport vehicle, in particular of the train, tramway, subway, bus or trolleybus type, comprising at least one door such as defined hereinabove.

The invention also has for object a stop platform for a transport vehicle, in particular of the train, tramway, subway, bus or trolleybus type, comprising at least one door such as defined hereinabove.

DESCRIPTION OF THE FIGURES

The invention shall be described hereinafter, in reference to the accompany drawings, given solely by way of non-limiting examples, wherein.

Figure 1:
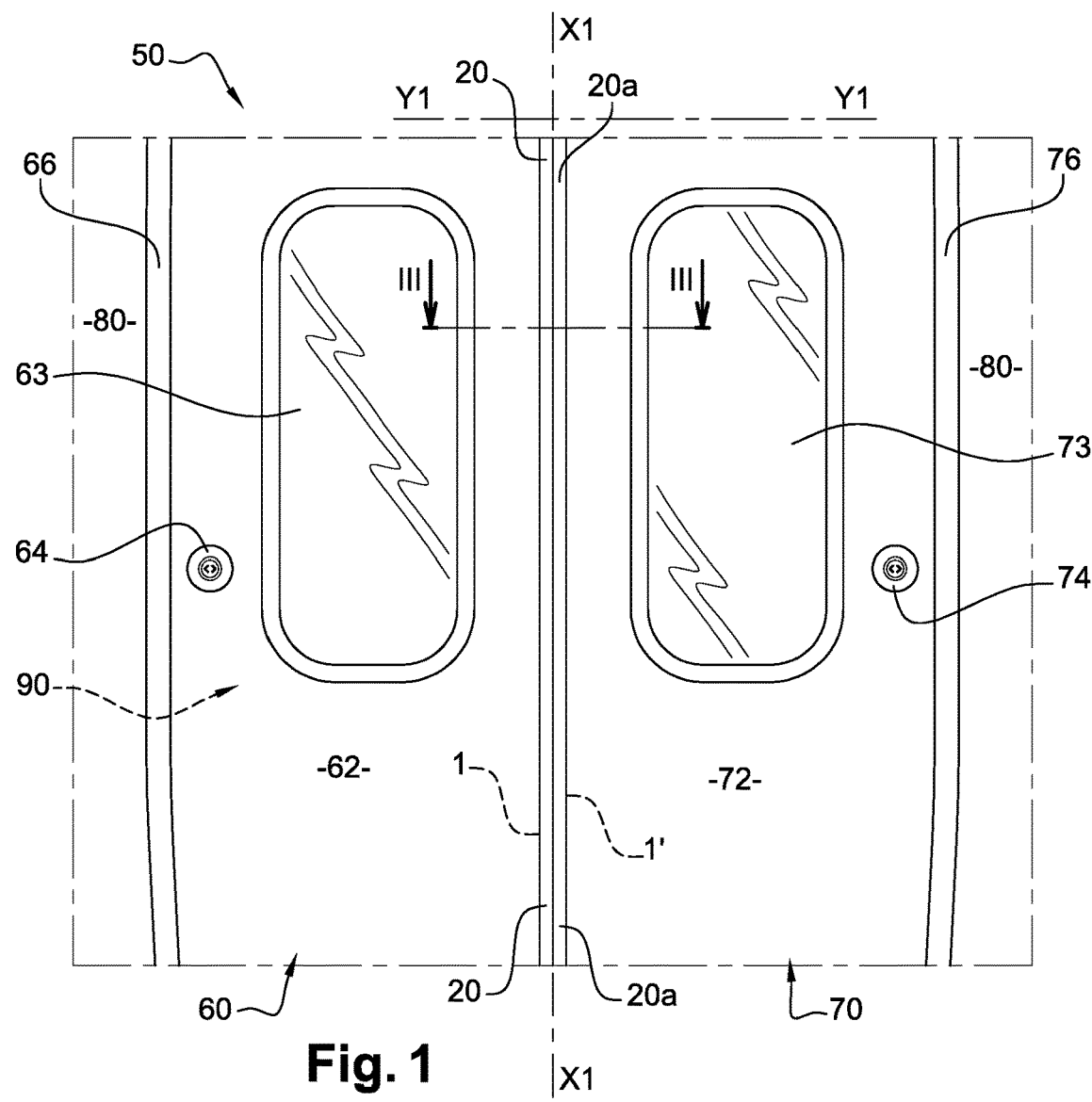
FIG. 1 is a diagrammatical front view, showing a door of a transport vehicle of which each door leaf is provided with a signaling assembly in accordance with the invention.
Figure 7:
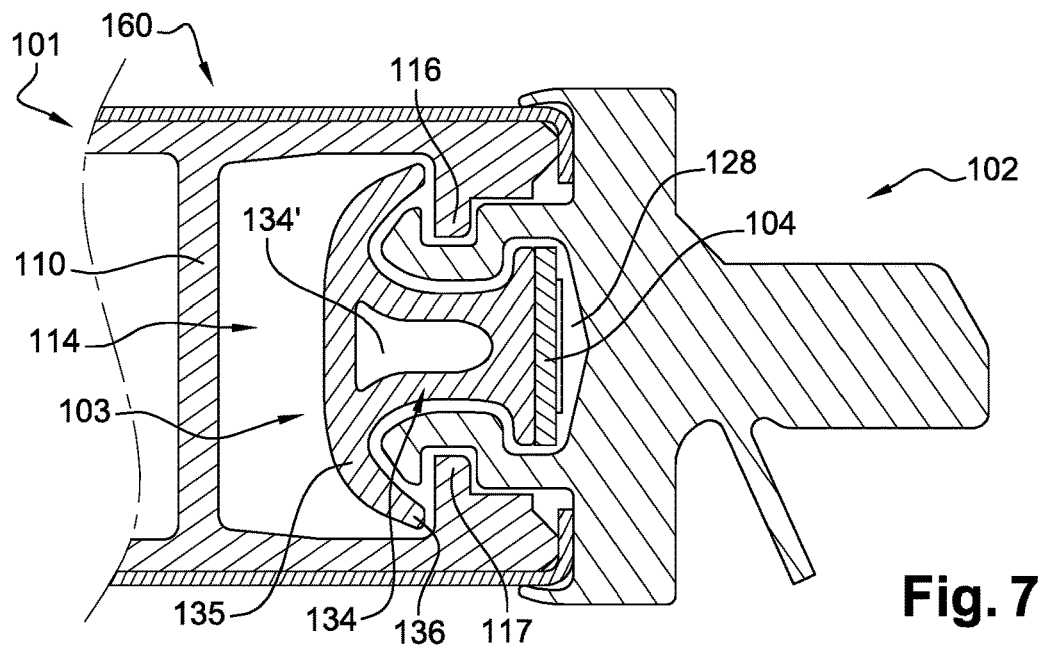
FIGS. 7 to 12 are top views, similar to FIG. 4, showing six alternative embodiments of the signaling assembly in accordance with the invention.
Figure 8:
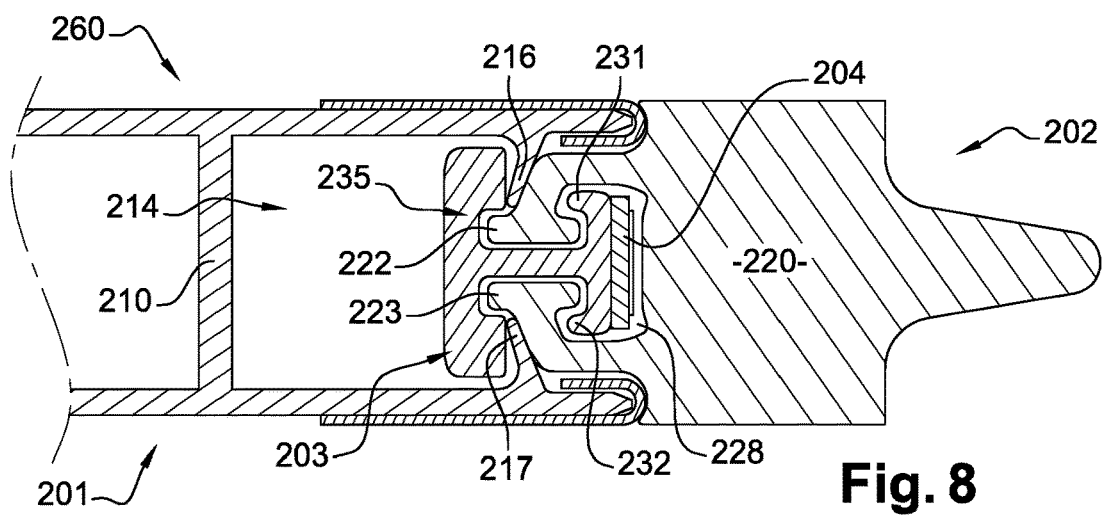
Figure 9:
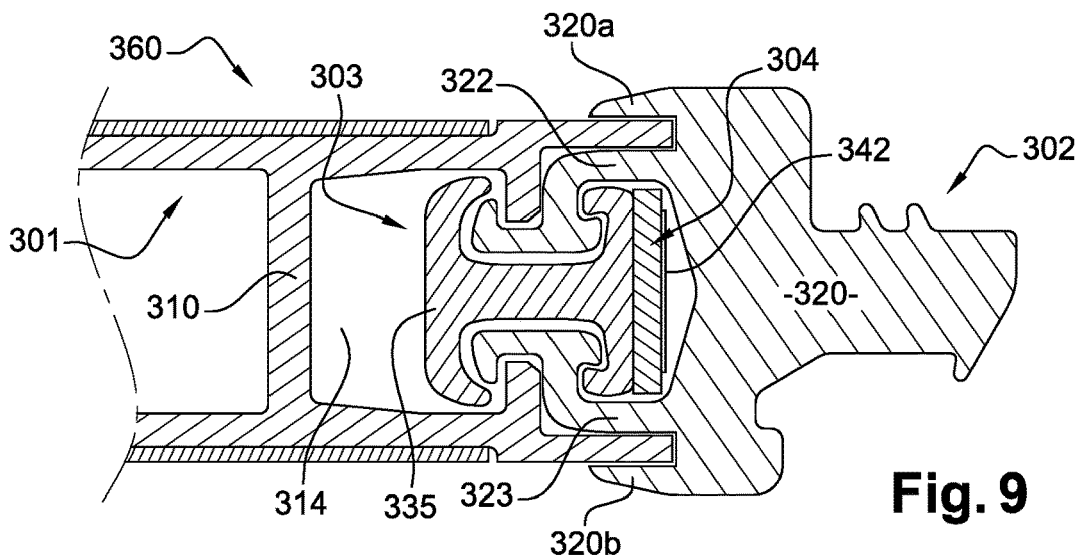
Figure 10:
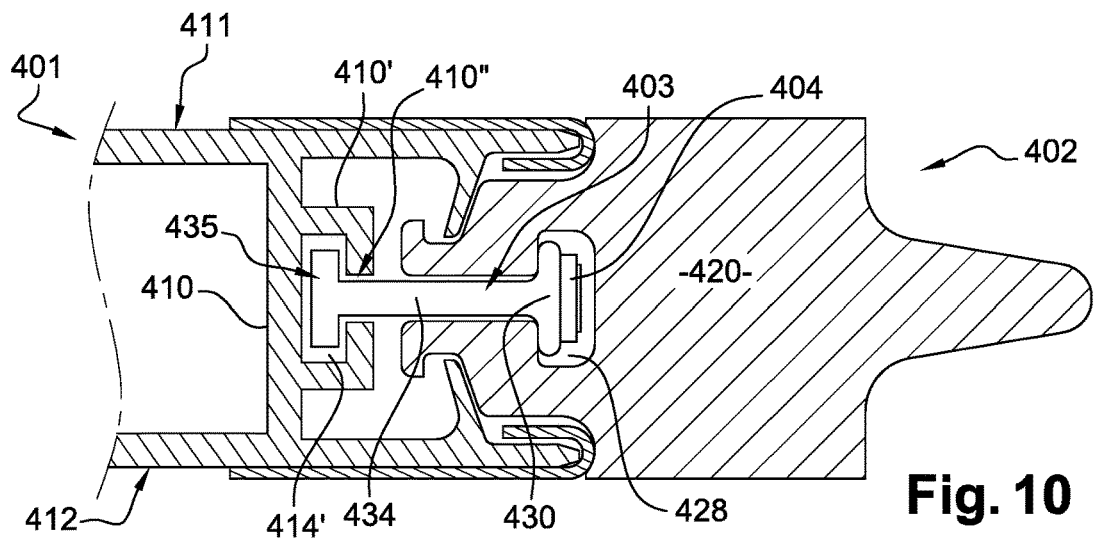
Figure 11:
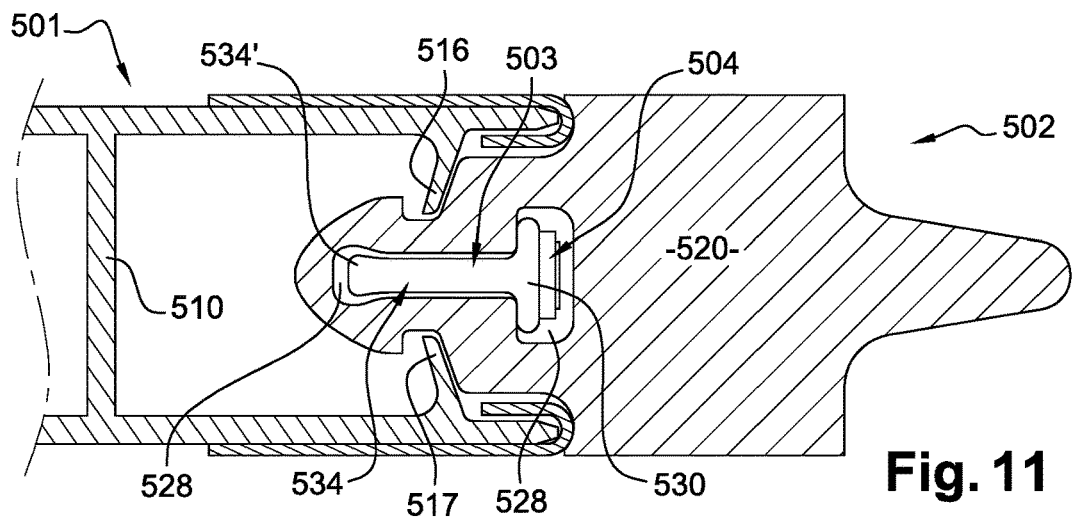
Figure 12:
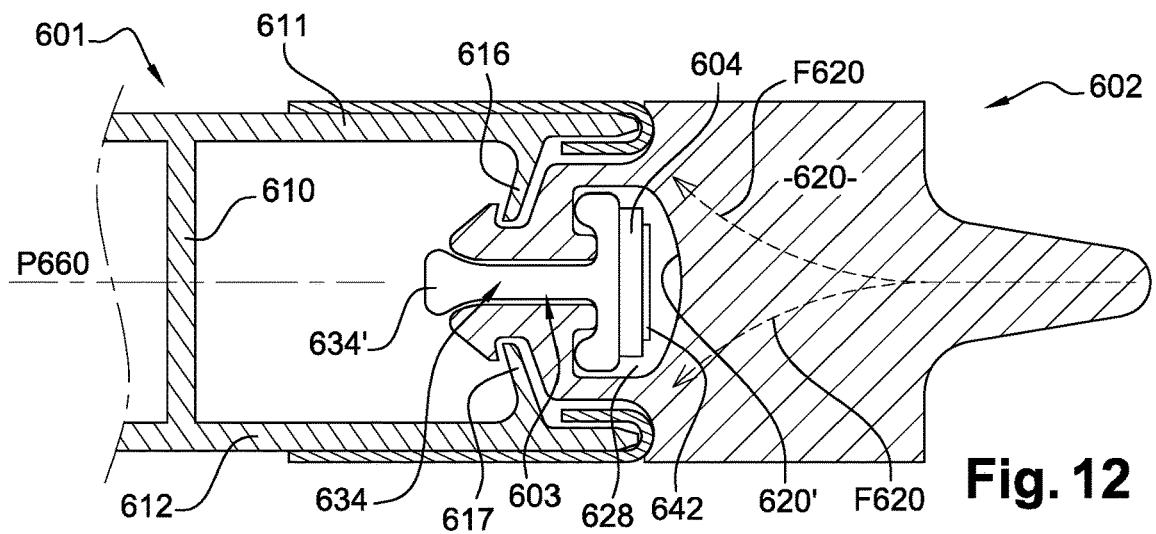

The following numerical marks are used in the drawings:

| | | | |
|---|---|---|---|
| 50 | Door | 60, 70 | Door leaves |
| 80 | Sash | 90 | Bay |
| 62, 72 | Body of 70 | 63, 73 | Window |
| 64, 74 | Push-button | 66, 76 | Frame of 70 |
| 1, 1' | Profile | 10 | Core of 1 |
| 11, 12 | Wings of 1 | P60 | Main plane of 60 |
| 14 | Housing of 1 | 16, 17 | Edges of 1 |
| 18, 19 | Sheets | X1 X1 | Longitudinal direction |
| Y1 Y1 | Transversal direction | 20 | Base of 2 |
| 2 | Seal | 21 | Attaching region of 2 |
| 20', 21' | Inner walls of 20, 21 | 22', 23' | Intermediate branch of 22, 23 |
| 22, 23 | Tabs of 2 | 24, 25 | Ribs of 2 |
| 22", 23" | Terminal branch of 22, 23 | 28 | Interior volume of 2 |
| 26, 27 | Attaching channels of 2 | 20a | Base of 1' |
| 29 | Deformation space of 28 | 30 | Foot of 3 |
| 3 | Locking key | 34 | Stem of 3 |
| 31, 32 | Lugs of 30 | 36 | Perimeter of 35 |
| 35 | Head of 3 | 39 | Slider of 3 |
| 38 | Edges of 3 | 40 | Support of 4 |
| 4 | Lighting member | 44 | Orifices of 40 |
| 42 | Diodes of 4 | F22, F23 | Coming together of the tabs 22, 23 |
| F2, F'2 | Displacements of the seal 2 | FIG. 7 | Same numbers + 100 |
| F'22, F'23 | Separating of the tabs 22, 23 | FIG. 9 | Same numbers + 300 |
| FIG. 8 | Same numbers + 200 | FIG. 11 | Same numbers + 500 |
| FIG. 10 | Same numbers + 400 | 414' | Secondary housing |
| 410' | Cover | 534' | Free end of 534 |
| 410" | Orifice of 410' | 634' | Free end of 634 |
| FIG. 12 | Same numbers + 600 | | |

DETAILED DESCRIPTION OF THE INVENTION

The accompanying FIG. 1 shows a door, designated as a whole by the reference 50, which is provided on a transport vehicle. This door comprises, usually, an opening part formed by two door leaves 60 and 70, as well as a sash 80 shown diagrammatically, which is arranged at the periphery of a bay 90 arranged in the body of this vehicle. This door can be provided with two door leaves such as in the example shown, but also with a single door leaf.

In the example shown, the door is provided on a train of the subway type. The invention can however be applied to doors intended to be provided on other transport vehicles such as in particular tramways, trolleybuses, or trains different from the one mentioned hereinabove. In what follows, it is assumed that the door leaves are vertical, in particular in reference to FIG. 1. Moreover, the terms "inner" and "outer" are used in reference to the body of this transport vehicle.

Each door leaf 60, 70 comprises, in a known manner, a central body 62, 72 provided in particular with a window 63, 73 and with a maneuvering member 64, 74, for example of the push-button type. This body is typically formed of two opposite claddings respectively interior and exterior, as well as a core inserted between these claddings. Moreover, a frame 66, 76 extends to the outer periphery of this body. This frame comprises in particular a profile, which is of the type known per se, provided on the vertical edges of the body.

The structure of the profile 1 provided on the door leaf 60 shall now be described, with the understanding that the other door leaf 70 has a profile 1' of identical structure, shown very diagrammatically in FIG. 1.

Figure 2:
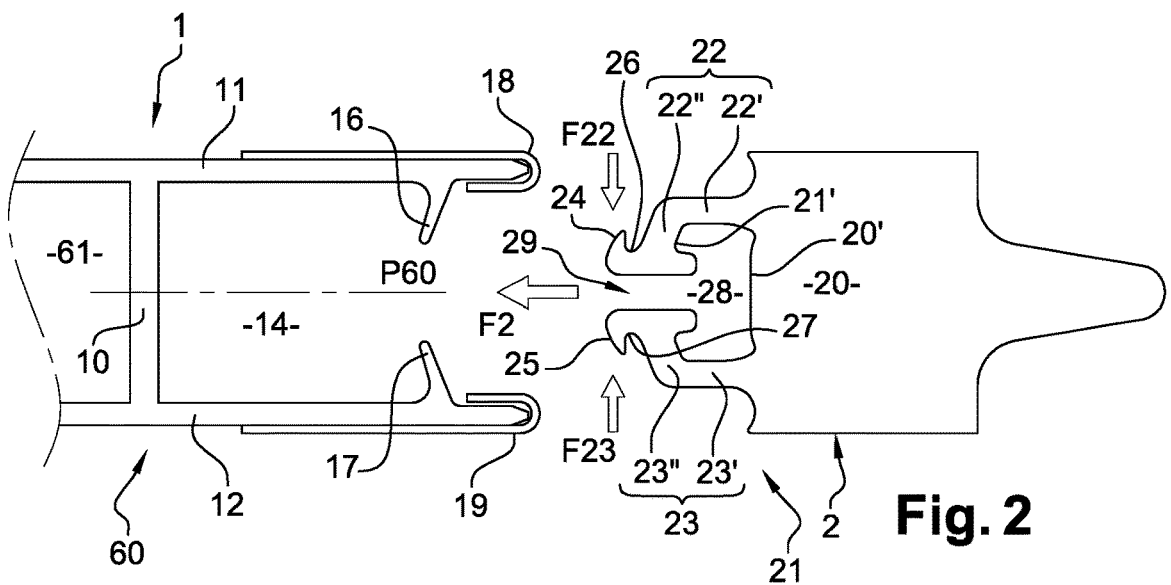
FIG. 2 is a top view, on a greater scale, showing a seal that belongs to the signaling assembly in accordance with the invention, as well as a profile that belongs to the door leaf of the door of FIG. 1, wherein this seal must be housed.
Figure 3:
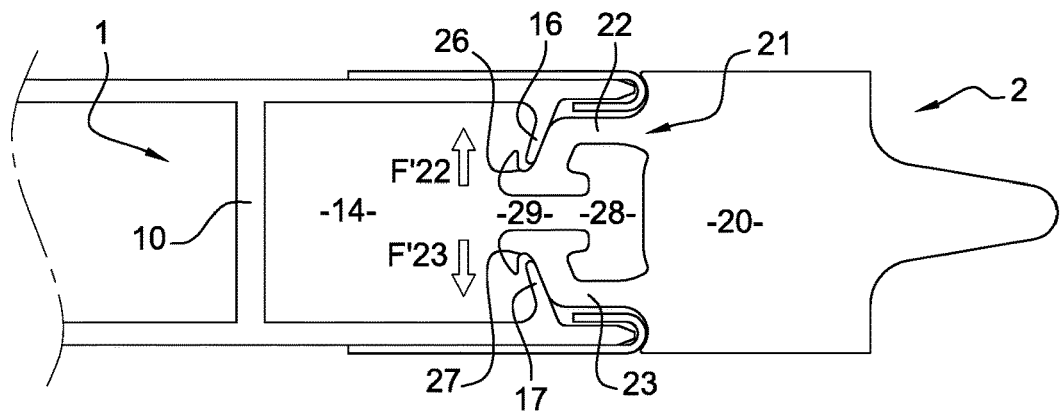
FIG. 3 is a top view, similar to FIG. 2, showing the seal housed in the profile.
Figure 4:
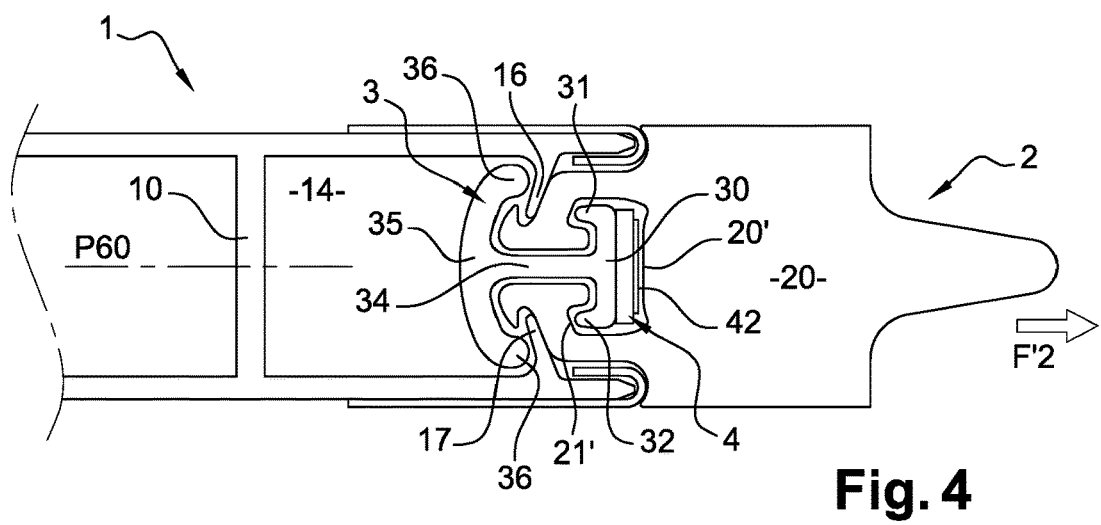
FIG. 4 is a top view, similar to FIG. 3, further showing a locking key provided with a lighting member, which is received in an interior volume of this seal.

As shown in particular in FIGS. 2 to 4, this profile 1 comprises a core 10, as well as two wings 11 and 12 extending parallel to the main plane P60 of the door leaf. This core 10 and these two wings 11 and 12 define a housing 14 substantially in the shape of a U, open opposite this body. Moreover, two edges 16 and 17 protrude one in the direction of the other, from a respective wing. As shall be seen in what follows, these edges provide an attaching function of a seal. Finally each wing is covered, at least partially, by a respective sheet 18 and 19, forming the inner and outer walls of the door leaf. In FIG. 1, a so-called longitudinal direction X1-X1 is defined, in reference to the main direction of the seal, and a so-called transversal direction Y1-Y1, in reference to this main direction. In this FIG. 1, the directions X1-X1 and Y1-Y1 are respectively globally vertical and globally horizontal.

In reference in particular to FIGS. 2 to 5, a signaling assembly in accordance with the invention shall now be described. The latter substantially comprises:

a translucent seal, designated as a whole by the reference 2 a locking key, designated as a whole by the reference 3; and a lighting member provided with light-emitting diodes, designated as a whole by the reference 4.

The seal 2 is made from any suitable material, that allows it to fulfill its main functions, namely the attaching thereof on the profile 1, the reflecting of the light emitted by the diodes, the sealing to water and the detecting of obstacles. Constructively, a translucent seal, made in particular of silicone, will typically be used. As an alternative, other materials can be chosen, such as a flexible PVC, a Thermoplastic Elastomer (TPE), a polyurethane, or any other suitable material.

This seal 2 first comprises a massive base 20 intended to protrude outside of the housing 14, in such a way as to constitute a lighting region of the seal. This base is extended by an attaching region 21, intended to be housed in the interior volume of the aforementioned housing. In the example shown, this attaching region is an elastic snap-fitting region. This region 21 comprises two tabs 22 and 23, in the shape of an L, which include intermediate branches that are mutually parallel 22' and 23', as well as end branches 22" and 23" protruding towards one another. The latter are extended by ribs 24 and 25, protruding opposite one another.

These ribs define, with the aforementioned tabs, attaching channels 26 and 27 intended to cooperate with the edges 16 and 17 with the profile. The base 20 and the attaching region 21 delimit a divider volume 28, bordered by walls 20' and 21' respectively belonging to this base 20 and this attaching region 21. This divider volume, which is intended for receiving the key 3, is open opposite the base 20 in such a way as to form a deformation space 29. The seal 2 extends over at least one substantial portion of the height of the door leaf and, preferably, over substantially all of this height. The divider volume 28 opens at least at a longitudinal end of the seal, in particular at its upper end. Preferably, this volume 28 occupies the entire seal, in such a way that it opens into the two longitudinal ends of the latter.

The key 3 first comprises a foot 30, intended to be received in the volume 28. This foot is provided with 2 lugs 31 and 32, cooperating with the faces facing the two tabs 22 and 23. This foot is extended by a stem 34, extending inside the deformation space 29 along the main plane P60. This stem is terminated by a rounded head 35, of which the concavity is turned towards the foot 30. The head 35 has a peripheral perimeter 36, that can bear against the edges of the profile.

This key 3 is made from a material that provides it with a mechanical resistance that is sufficient to block the seal 2, against the forces aiming to extract the latter outside of the housing 14 of the profile 1. The material that forms the key is also suited, in order to allow the latter to provide a support function for the lighting member that shall be described hereinbelow. With this in mind, a key made from a plastic material can in particular be chosen, which can be adapted to all types of door leaves, in particular curved door leaves.

This key can also be made from a material that provides an additional function of dissipation of the heat, generated in service by the lighting member. In this respect, a key made from aluminum or from a similar material can be chosen. Note however that this type of material is less suited than a plastic material, for curved door leaves.

The key 3 extends over at least one substantial portion of the height of the seal 2 and, preferably, over substantially all of this height. However, it should be avoided that this key 3 protrude longitudinally with respect to the seal 2, once the signaling assembly according to the invention is mounted on the door leaf 60. Indeed such a longitudinal exceeding of the key would be able to disturb the proper operation of the door leaf. A means of immobilization is therefore advantageously provided that prevents this key from sliding longitudinally, outside of the interior volume of the seal.

To this effect, one or several means of immobilization can be used, alone or in combination. More preferably these means of immobilization are removable or reversible means, namely they can be dismounted without risk of damaging the key or the seal. By way of example, a plug can be fixed at each end of the seal, thus sealing off the output of the interior volume 28. It is also possible to glue the key to the inner wall of the interior volume 28, for example using a thick flexible glue of the polyurethane type. It is also possible to set up an axis in the horizontal plane, preventing the translation of the key along the vertical axis: this axis can in particular be a pin or a screw. It is also possible to set up a screw, not shown, that connects the seal to the key; this screw can for example be self-tapping in the material of the key.

Finally the lighting member 4 first comprises an extended body 40, forming a support. This body is made from a material that gives it sufficient mechanical resistance, in such a way that it can be fixed to the key. Typically, this body is formed by a PCB (Printed Circuit Board), of the type known per se. This body 40 is provided with a plurality of lighting elements, which are light-emitting diodes 42 in the example shown. The number of these diodes, which are of a type known per se, is for example between 20 and 600. These diodes are controlled conventionally, by the intermediary of control means not shown, of the type known per se. As shown in particular in FIG. 4, the diodes 42 are arranged in the vicinity of the lighting region 20, by being turned towards the facing wall 20' that belongs to the latter.

The lighting member 4 extends over at least one substantial portion of the height of the key 3 and, preferably, over all of this height. This member 4 is mounted on the key 3 thanks to means of fastening, that can be used alone or in a mutual combination.

Figure 5:
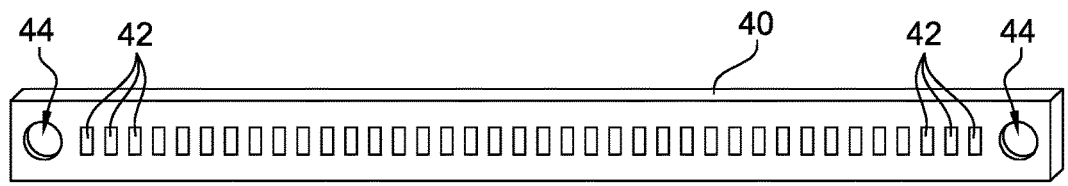
FIG. 5 is a front view, showing more particularly the lighting member of FIG. 4.

In the example of FIG. 5, two orifices 44 are provided at the opposite ends of the body 40, in such a way as to allow for the screwing of this body on the foot 30 of the key 3. As an alternative not shown, it can also be provided that the body 40 be glued on the face facing this foot 30.

Figure 6:
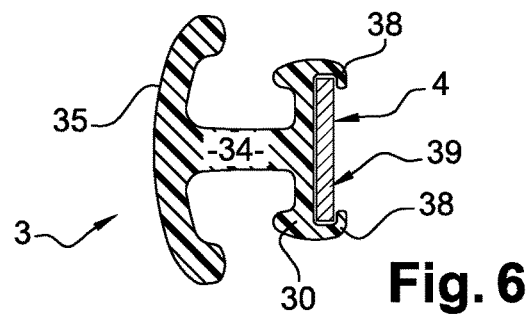
FIG. 6 is a top view, showing a mounting alternative of the signaling element on the locking key.

FIG. 6 shows an additional alternative, in which the foot 30 is extended by two edges 38, which define a slider 39. The latter allows for a longitudinal inserting of the lighting member 4, while still providing the retaining thereof along a transversal direction The mounting of the seal 2 and of the key 3, on the profile 1, shall now be described. In theory the seal 2 can be introduced into the profile 1 along a longitudinal direction, namely parallel to that X1-X1 of FIG. 1. However, this solution is not preferred as it does not offer any satisfactory practicality in terms of mounting. Preferably, in reference to FIG. 2, the seal 2 is first of all displaced in the direction of the profile, according to the arrow F2 which corresponds to a transversal direction parallel to the direction Y1-Y1 of FIG. 1.

When the seal comes into contact with the edges 16 and 17, the tabs 22 and 23 come together mutually according to the arrow F22 and F23. In this way, these tabs progress towards the bottom of the housing, then move away again mutually due to their elastic nature according to the arrows F'22 and F'23 (see FIG. 3). In this configuration, the edges 16 and 17 penetrate into the channels 26 and 27. Note however that, at this stage, the tabs do not offer a mechanical resistance that is sufficient to prevent a pulling off of the seal, along the direction F2. In this respect, this low mechanical resistance of the tabs allows for an easy displacement of the seal between the configurations of FIGS. 2 and 3, without any substantial physical effort for the operator.

Once the seal 2 is made integral on the profile 1 in the substantially definitive position that it must adopt, into the interior volume 28 of this seal is introduced the locking key 3 and the lighting member 4 which is mounted on the latter. This introduction is typically carried out longitudinally, namely along the direction X1-X1 of FIG. 1. When the key 3 is in the desired position, it is advantageously immobilized with respect to the seal, thanks to the means of immobilization described hereinabove.

The functional configuration of the signaling assembly, in accordance with the invention, is shown in FIG. 4. The latter shows that the various diodes 42 are placed as close as possible to the illuminated region of the seal, which gives substantial visibility to the information emitted for the attention of the travelers. In this respect, this illuminated region 20 and the profile 1 are shown in FIG. 1, as well as the illuminated region 20a and the profile 1' associated with the other door leaf 70.

In this functional configuration, the presence of the key 3 furthermore provides the seal 2 with a high resistance, with regards to a pulling off according to the transversal direction Y1-Y1. Indeed, the perimeter 36 of the head of this key 3 presses directly against the edges 16 and 17, in such a way as to oppose such a pulling off. Moreover, the walls facing the foot 30 and the interior volume 28 of the seal delimit zones of mutual contact with a substantial surface, which provides additional resistance against such a pulling off.

If it is desired to detach the signaling assembly in accordance with the invention, with respect to the seal 2, the means allowing for the immobilization of the key with respect to this seal are first of all removed. Then, this key is removed according to the longitudinal direction X1-X1. Finally, the seal 2 is extracted outside of the housing defined by the profile 1. In theory, this operation can be carried out according to the longitudinal direction. However, preferably, a transversal force is exerted on the seal according to the arrow F'2 of FIG. 4, opposite that materialized by the arrow F2 of FIG. 2. Given their low mechanical resistance, as mentioned hereinabove, the tabs of the seal do not oppose such an action. The latter can therefore be implemented by the user simply and quickly, without exerting a physical effort of high intensity.

FIG. 7 shows a first alternative of the signaling assembly, in accordance with the invention. In this FIG. 7, the mechanical elements similar to those of FIGS. 2 to 4 are assigned the same reference numbers, increased by 100. The signaling assembly of this FIG. 7 differs mainly from that of FIGS. 2 to 4, in that the stem 134 of the key 103 is hollowed by a central notch 134'. This makes it possible to maintain a thickness that is nearly constant, in order to prevent the problems of shrinkage. Moreover this key is of massive form, which is an advantage for thermal dissipation, if this key is made from a material such as aluminum.

FIG. 8 shows a second alternative of the signaling assembly, in accordance with the invention. In this FIG. 8, the mechanical elements that are similar to those of FIGS. 2 to 4 are assigned the same reference numbers, increased by 200. The signaling assembly of this FIG. 8 differs mainly from the one of FIGS. 2 to 4, in that the tabs 222 and 223 are devoid of ribs, such as those 24 and 25 of the first embodiment. In these conditions, the attaching portion is not snap-fitted on the edges 216 and 217, but simply adjusted by entrapment between the latter. The fastening of the seal is provided by the key 203, in particular its lugs 231 and 232 and its head 235 that covers the aforementioned tabs 222 and 223, while still abutting against the edges 216 and 217. This embodiment is very particularly well suited for small areas.

FIG. 9 shows a third alternative of the signaling assembly, in accordance with the invention. In this FIG. 9, the mechanical elements similar to those of FIGS. 2 to 4 are assigned the same reference numbers, increased by 300. The signaling assembly of this FIG. 9 differs mainly from the one of FIGS. 2 to 4, in that the door leaf 360 has a lower thickness, typically in the neighborhood of 25 millimeters. Note that the illuminated region 320 is extended by two strips 320a and 320b, which cover the free ends of the profile 301 opposite the tabs 322 and 323.

FIG. 10 shows a fourth alternative of the signaling assembly, in accordance with the invention. In this FIG. 10, the mechanical elements similar to those of FIGS. 2 to 4 are assigned the same reference numbers, increased by 400. The signaling assembly of this FIG. 10 differs mainly from the one of FIGS. 2 to 4, in that the core 410 of the profile 401 is provided with a cover 410', delimiting a space 414' or secondary housing. The latter communicates with the main housing 414 via an orifice 410" of the cover, through which penetrates the stem 434 of the key 403, in such a way that the head 435 of the key can be received in the secondary space 414'. In case of a traction force undergone by the seal, the head 435 of the key 403 abuts against the inner faces facing the cover 410', in such a way that the key opposes the pulling off of this seal.

FIG. 11 shows a fifth alternative of the signaling assembly, in accordance with the invention. In this FIG. 11, the mechanical elements similar to those of FIGS. 2 to 4 are assigned the same reference numbers, increased by 500. The signaling assembly of this FIG. 11 differs mainly from that of the preceding figures, in that the divider volume 528 of the seal 502 is closed as a transversal view. In these conditions, the key 503 is entirely housed in this volume 528, without protruding outside of the latter. Moreover, this key is devoid of a head. However the free end 534' of its stem 534 is flared in such a way as to prevent any collapsing of the seal 502, on its region in contact with the edges 516 and 517.

FIG. 12 shows a sixth alternative of the signaling assembly, in accordance with the invention. In this FIG. 12, the mechanical elements similar to those of FIGS. 2 to 4 are assigned the same reference numbers, increased by 600. Just as the key 503 of the embodiment of FIG. 11, the key 603 of this embodiment is devoid of a head. Moreover the free end 634' of the stem 634 is flared in such a way as to prevent any collapsing of the seal 602, on its region in contact with the edges 616 and 617. On the other hand, the divider volume 628 of the seal 602 is open in a transversal view, in such a way that this free end protrudes slightly outside of this volume 628.

Moreover the wall 620' of the base 620, bordering the divider volume 628, is rounded. In other terms, the distance between this wall and the lighting elements 642 decreases, from the median region of this wall to the lateral zones thereof. This makes it possible to distribute the impacts exerted, according to the main plane P660 of the door leaf, in the direction of the aforementioned lateral zones, such as is materialized by the arrows F620. In this way, the lighting elements 642 are substantially protected against such impacts. Alternatively, this wall 620' can have any form equivalent to a rounded shape, in particular an arched shape as in FIG. 9, or in the form of a tip.

The signaling assembly, in accordance with the invention, has many advantages in relation to prior art.

First of all the invention makes it possible to generate a light intensity, in the region of the seal to be illuminated, which is much higher than in the known solutions. In particular, this light intensity guarantees a satisfactory perception for the users, even when the aforementioned seal is exposed to natural light, in particular to the sun. Indeed, according to the invention, the means of lighting are housed in an interior volume arranged in the seal, as close as possible to the illuminated region of the latter. Consequently, the distance separating these means of lighting and this illuminated region is reduced. Advantageously no mechanical element, able to interfere with the light emitted by the means of lighting, is interposed between these means of lighting and this illuminated region.

Moreover, the invention makes it possible to facilitate the mounting of the means of lighting, with regards to known solutions. Indeed, these means of lighting can be fixed directly on the locking key, before the insertion of the latter into the interior volume of the seal. The invention therefore makes it possible to overcome any problems of accessibility, linked to the means of lighting which would be mounted at the bottom of the housing of the profile. Note that, according to the invention, this accessibility is not affected in the case where the aforementioned housing receives equipment required for the proper operation of the door leaf, such as cables or a linkage. The prior fastening of these means of lighting on the key also reduces the risks of deterioration, during mounting.

Furthermore, the invention guarantees a maintenance of the means of lighting which is particularly practical. Indeed, according to the invention, the means of lighting can be changed via a simple extraction of the locking key, according to a longitudinal direction. Consequently, the invention does not require detaching the whole of the seal, outside of the housing of the profile.

In addition the invention allows for an easy mounting of the seal in its housing, while guaranteeing a maintaining in place that is reliable. Thus, as was seen hereinabove, the attaching of the seal on the profile can be carried out without substantial physical effort from the operator. Moreover, the presence of the locking key allows for a safe mounting, in particular against a transversal extraction of this seal.

In this respect, note that the presence of the head 36, forming a region referred to as the abutment of the key, is very particularly advantageous. Indeed, it offers a resistance that is particularly reliable against efforts of pulling off the seal. The invention also has application in a sealing assembly, which is devoid of means of lighting, which assembly comprises a seal and a locking key that incorporate such an abutment region.

Finally, according to an advantageous characteristic of the invention, the lighting member is integrated into the global volume, formed by the door leaf and the seal that it is associated with. In FIG. 2, this volume is bordered by the wings 11 and 12 of the profile 1, as well as by the faces respectively interior and exterior of the base 20. In other terms, this lighting member does not protrude laterally, in relation to the edges of this door leaf and of this seal. This makes it possible to protect the lighting member from impact, exerted along an axis perpendicular to the main plane of the door leaf. In this respect, recall that the solution proposed by WO 2011/138292 is not satisfactory in this aspect, since it provides for placing this lighted member on the door leaf.

The invention claimed is:

1. A signaling assembly for a door leaf of an access door to a transport vehicle the door leaf comprising a body and a profile extending over at least one portion of a periphery of the body of the door leaf, the profile defining a housing open opposite of the body, the signaling assembly comprising:
a seal that includes an attaching region positioned to be at least partially received in the housing of the profile, the seal also including a lighting region;
a lighting member configured to illuminate the lighting region of the seal to emit at least one visual signal representative of one or more of an opened or a closed state of the door;
at least one locking key at least partially received in an interior volume of the seal, the at least one locking key configured to prevent a pulling off of the seal outside of the profile along a transversal direction relative to a main direction of the seal, the lighting member fixed on the at least one locking key.

2. The signaling assembly according to claim 1, wherein the interior volume of the seal is bordered by faces of the attaching region and the lighting region, the lighting member turned toward the face of the lighting region.

3. The signaling assembly according to claim 1, wherein the lighting member includes a support and lighting elements carried by the support.

4. The signaling assembly according to claim 3, wherein the lighting elements include light-emitting diodes.

5. The signaling assembly according to claim 1, further comprising:
a fastening slider configured to fasten the lighting member onto the at least one locking key.

6. The signaling assembly according to claim 1, wherein a portion of the at least one locking key protrudes outside of the interior volume and directly contacts the profile of the door leaf.

7. The signaling assembly according to claim 1, wherein a distance between a wall of the lighting region that borders a divider volume of the seal and the lighting member decreases from a median region of the wall to lateral zones of the wall.

8. The signaling assembly according to claim 1, wherein the lighting member is integrated into a global volume formed by the door leaf and the seal to protect the lighting from impact exerted along an axis perpendicular to a main plane of the door leaf.

9. A door signaling assembly comprising:
a seal having a lighting region, an attaching region configured to be at least partially received into a profile housing of a door leaf of a vehicle door, and an interior volume;
a lighting member configured to emit a visual signal representative of one or more of an open state or a closed state of the vehicle door by illuminating the lighting region of the seal;
a locking key configured to be at least partially received into the interior volume of the seal, the locking key preventing the seal from being pulled off the door leaf, wherein the lighting member is coupled to the locking key.

10. The door signaling assembly of claim 9, wherein the interior volume of the seal is bordered by the lighting region and the attaching region with the lighting member facing the lighting region.

11. The door signaling assembly of claim 9, wherein the lighting member includes a support with plural lighting elements coupled to the support.

12. The door signaling assembly of claim 9, further comprising:
a fastening slider configured to fasten the lighting member to the locking key.

13. A signaling assembly comprising:
a seal configured to be at least partially received into a housing of a door leaf of a vehicle door;
a lighting member disposed within the seal and configured to generate light, the lighting member configured to generate the light to indicate one or more of an open state or a closed state of the vehicle door, a locking key configured to be received into the seal and prevent the seal from being separated from the vehicle door, wherein the lighting member is coupled to the locking key.

14. The signaling assembly of claim 13, further comprising:
a slider configured to fasten the lighting member to the locking key.

15. The signaling assembly of claim 13, wherein the seal includes an attaching region configured to be at least partially received into the housing of the door leaf and a different lighting region that is illuminated by the lighting member.

16. The signaling assembly of claim 15, wherein the attaching region and the lighting region are separated from each other by an open interior volume of the seal.

17. The signaling assembly of claim 16, further comprising:
a slider configured to be disposed within the interior volume of the seal and to fasten the lighting member to the locking key.

18. The signaling assembly of claim 16, wherein the locking key extends out of the interior volume of the seal.

* * * * *